(12) United States Patent
Stein (10) Patent No.: US 11,104,450 B2
(45) Date of Patent: Aug. 31, 2021

(54) ASSEMBLIES AND METHODS FOR LANDING GEAR ROTATIONAL POSITION SENSOR INSTALLATION

(71) Applicant: GOODRICH CORPORATION, Charlotte, NC (US)

(72) Inventor: Eric Stein, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 381 days.

(21) Appl. No.: 16/034,840

(22) Filed: Jul. 13, 2018

(65) Prior Publication Data

US 2019/0344904 A1    Nov. 14, 2019

Related U.S. Application Data

(60) Provisional application No. 62/671,322, filed on May 14, 2018.

(51) Int. Cl.
| | |
|---|---|
| *B64D 45/00* | (2006.01) |
| *B64C 25/60* | (2006.01) |
| *F16F 9/10* | (2006.01) |
| *F16F 9/32* | (2006.01) |
| *G01D 5/22* | (2006.01) |

(52) U.S. Cl.
CPC .......... *B64D 45/0005* (2013.01); *B64C 25/60* (2013.01); *F16F 9/10* (2013.01); *F16F 9/3264* (2013.01); *G01D 5/2291* (2013.01)

(58) Field of Classification Search
CPC ........ B64D 45/0005; B64C 25/60; F16F 9/10; F16F 9/3264; F16F 9/3292; G01D 5/2291
See application file for complete search history.

(56) References Cited

U.S. PATENT DOCUMENTS

| | | | | |
|---|---|---|---|---|
| 3,517,550 | A * | 6/1970 | Leventhal | G01L 5/0052 |
| | | | | 73/764 |
| 4,770,372 | A * | 9/1988 | Ralph | B64C 25/60 |
| | | | | 244/102 R |
| 5,861,745 | A * | 1/1999 | Herden | G01B 7/30 |
| | | | | 324/207.2 |
| 7,274,309 | B2 * | 9/2007 | Nance | B64D 45/00 |
| | | | | 244/100 R |
| 7,274,310 | B1 | 9/2007 | Nance | |

(Continued)

FOREIGN PATENT DOCUMENTS

| | | | | |
|---|---|---|---|---|
| EP | | 2957501 | 12/2015 | |
| WO | WO-2016149747 A1 * | | 9/2016 | G10H 3/188 |

OTHER PUBLICATIONS

European Patent Office, European Search Report dated Oct. 7, 2019 in Application No. 19174040.6.

*Primary Examiner* — Thomas W Irvin
(74) *Attorney, Agent, or Firm* — Snell & Wilmer L.L.P.

(57) ABSTRACT

A shock strut assembly may comprise a strut cylinder and a strut piston configured to telescope relative to the strut cylinder. A torque link may be pivotally coupled to the strut cylinder. A rotational position sensor may be configured to measure an angle of the torque link relative to a plane parallel to a center axis of the strut piston. The rotational position sensor may be oriented such that the rotational position sensor is within a null accuracy band of the rotational position sensor when the strut piston is in a fully compressed state.

17 Claims, 5 Drawing Sheets

(56) References Cited

U.S. PATENT DOCUMENTS

| | | | |
|---|---|---|---|
| 7,376,507 B1* | 5/2008 | Daily | G01C 21/00 |
| | | | 340/988 |
| 8,042,765 B1* | 10/2011 | Nance | B64D 45/0005 |
| | | | 244/100 R |
| 8,565,968 B2* | 10/2013 | Nance | G01M 3/36 |
| | | | 701/37 |
| 9,045,237 B2* | 6/2015 | Nance | G01M 17/04 |
| 9,308,991 B2* | 4/2016 | Li | F16F 9/0245 |
| 9,773,357 B2 | 9/2017 | Fazeli et al. | |
| 9,927,319 B2* | 3/2018 | Nance | G01M 1/125 |
| 2006/0284008 A1 | 12/2006 | Nance | |
| 2017/0166330 A1 | 6/2017 | Fazeli et al. | |
| 2018/0247618 A1* | 8/2018 | Walker | G10H 1/0555 |

* cited by examiner

ASSEMBLIES AND METHODS FOR LANDING GEAR ROTATIONAL POSITION SENSOR INSTALLATION

CROSS REFERENCE TO RELATED APPLICATIONS

This application claims priority to, and the benefit of, U.S. Provisional Application Ser. No. 62/671,322, entitled "ASSEMBLIES AND METHODS FOR LANDING GEAR ROTATIONAL POSITION SENSOR INSTALLATION," filed on May 14, 2018, which is incorporated in its entirety herein for all purposes by reference.

FIELD

The present disclosure relates to landing gear, and more particularly, to landing gear position sensors.

BACKGROUND

Shock absorbing devices are used in a wide variety of vehicle suspension systems to control motion of the vehicle and its tires with respect to the ground and to reduce transmission of transient forces from the ground to the vehicle. Shock absorbing struts are a common component in most aircraft landing gear assemblies. Shock struts control motion of the landing gear, and absorb and damp loads imposed on the landing gear during landing, taxiing, braking, and takeoff. Calculating a stroke of a landing gear shock strut from an angle of a torque link of the shock strut can be difficult due to the difficult operational environment and to the needed precision of the measurements. Additionally, as the landing gear compresses, there is less rotation of the torque link (i.e., angular change) per unit of linear stroke change, as compared to when the landing gear is uncompressed. The reduction in angle change per unit of stroke as the landing gear compresses tends to affect stroke sensor accuracy, such that there is a reduction in mechanical resolution as the landing gear compresses.

SUMMARY

A shock strut assembly is disclosed herein. In accordance with various embodiments, the shock strut assembly may comprise a strut cylinder and a strut piston configured to telescope relative to the strut cylinder. A first torque link may be pivotally coupled to the strut cylinder. A second torque link may be pivotally coupled to the strut piston. A rotational position sensor may be configured to measure at least one of an angle of the first torque link relative to the strut cylinder or an angle of the second torque link relative to the strut piston. The rotational position sensor may be oriented such that the rotational position sensor is within a null accuracy band of the rotational position sensor in response to the strut piston being at a first stroke length.

In various embodiments, the rotational position sensor may comprise a first error range within the null accuracy band and a second error range outside the null accuracy band. The second error range may be greater than the first error range.

In various embodiments, the rotational position sensor may be oriented such that the rotational position sensor is at or near an edge of the null accuracy band in response to the strut piston being at the first stroke length. In various embodiments, the first stroke length may correspond to the shock strut assembly being in a fully compressed state.

In various embodiments, the rotational position sensor may be oriented such that as the strut piston translates between the first stroke length and a second stroke length the rotational position sensor rotates toward a null point of the rotational position sensor. The second stroke length may be greater than the first stroke length. In various embodiments, the rotational position sensor may oriented such that as the strut piston translates beyond the second stroke length the rotational position sensor rotates away from the null point of the rotational position sensor.

In various embodiments, the rotational position sensor may be oriented such that the rotational position sensor will be within the null accuracy band for a predetermined range of torque link angles. In various embodiments, the rotational position sensor may comprise at least one of a rotary variable differential transformer, a resolver, or an encoder.

A landing gear assembly is also disclosed herein. In accordance with various embodiments, the landing gear assembly may comprise an axle configured to support a wheel; and a shock strut assembly coupled to the axle. The shock strut assembly may comprise a strut cylinder and a strut piston configured to telescope relative to the strut cylinder. A torque link may be pivotally coupled to at least one of the strut cylinder or the strut piston. A rotational position sensor may be configured to measure an angle of the torque link relative to the at least one of the strut cylinder or the strut piston. The rotational position sensor may be oriented such that the rotational position sensor is within a null accuracy band of the rotational position sensor in response to the strut piston being at a first stroke length.

In various embodiments, the rotational position sensor may comprise a first error range within the null accuracy band and a second error range outside the null accuracy band. The second error range may be greater than the first error range.

In various embodiments, the rotational position sensor may be oriented such that the rotational position sensor is at or near an edge of the null accuracy band in response to the strut piston being at the first stroke length. In various embodiments, the first stroke length may correspond to the shock strut assembly being in a fully compressed state. In various embodiments, the rotational position sensor may be oriented such that the null accuracy band extends from a torque link angle of 30° to a torque link angle of 50°.

In various embodiments, a controller may be configured to receive a rotational data signal from the rotational position sensor and determine a stroke length based on the rotational data signal.

In various embodiments, the rotational position sensor may be oriented such that as the strut piston translates between the first stroke length and a second stroke length the rotational position sensor rotates toward a null point of the rotational position sensor. The rotational position sensor may be oriented such that as the strut piston translates between the second stroke length and a third stroke length the rotational position sensor rotates away from the null point of the rotational position sensor. In various embodiments, the second stroke length may be greater than the first stroke length, and the third stroke length may be greater than the second stroke length.

A method of installing a rotational position sensor in a shock strut assembly is also disclosed herein. In accordance with various embodiments, the method may comprise operably coupling the rotational position sensor to a torque link of the shock strut assembly, and configuring the rotational position sensor to be within a null accuracy band of the rotational position sensor in response to the shock strut assembly being at a first stroke length.

In various embodiments, the rotational position sensor may comprise a first error range within the null accuracy band and a second error range outside the null accuracy band.

In various embodiments, the step of configuring the rotational position sensor to be within the null accuracy band of the rotational position sensor in response to the shock strut assembly being at the first stroke length may comprise configuring the rotational position sensor to be at or near an edge of the null accuracy band in response to the shock strut assembly being at the first stroke length. In various embodiments, the first stroke length may correspond to the shock strut assembly being in a fully compressed state.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "distal" refers to the direction outward, or generally, away from a reference component. As used herein, "proximate" refers to a direction inward, or generally, towards the reference component.

Figure 1:
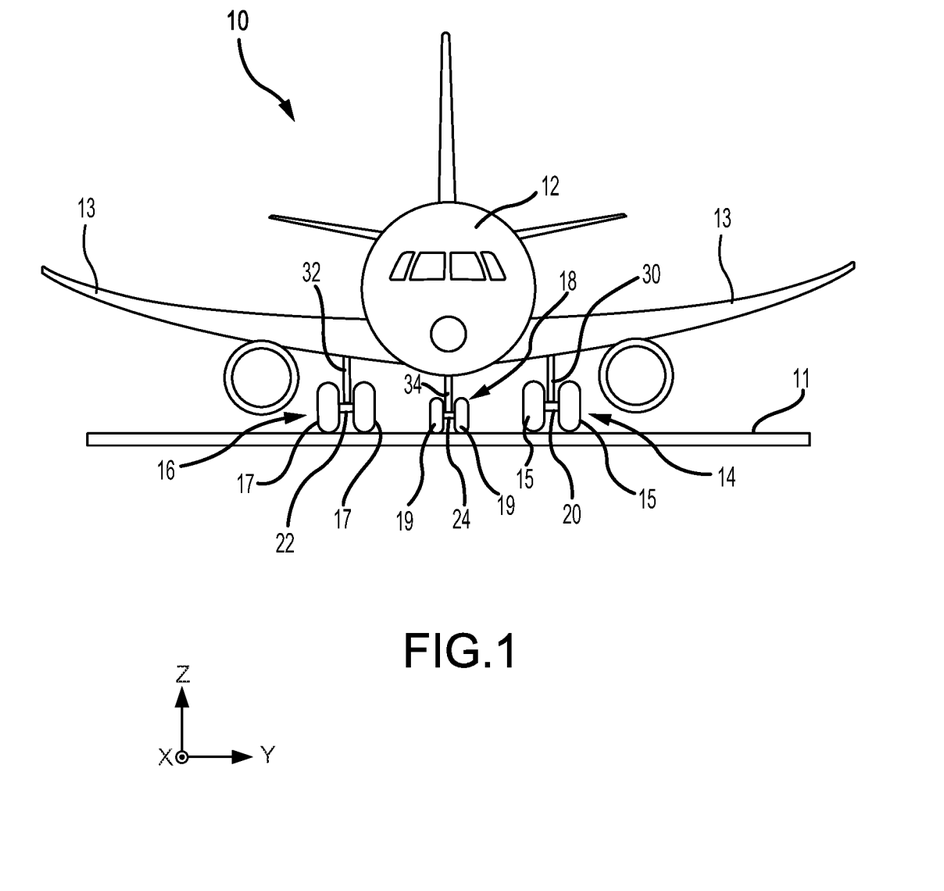
FIG. 1 illustrates an aircraft with landing gear, in accordance with various embodiments.

With reference to FIG. 1, an aircraft 10 on runway 11 is illustrated, in accordance with various embodiments. Aircraft 10 may include a fuselage 12 and wings 13. Aircraft 10 may further include landing gear such as landing gear 14, landing gear 16, and landing gear 18. Landing gear 14, landing gear 16, and landing gear 18 may generally support aircraft 10, when aircraft 10 is not flying, allowing aircraft 10 to taxi, take off, and land without damage. Landing gear 14 may include a shock strut assembly 30 and a pair of wheels 15 coupled by an axle 20. Landing gear 16 may include a shock strut assembly 32 and a pair of wheels 17 coupled by an axle 22. Landing gear 18 may include a shock strut assembly 34 and a pair of nose wheels 19 coupled by an axle 24. In various embodiments, nose wheels 19 may differ from the wheels 15 and wheels 17 in that the nose wheels 19 may not include a brake. While landing gear 14, landing gear 16, and landing gear 18 are illustrated as each having two wheels, it should be understood that the assemblies and methods described herein may be used with landing gear having any number and/or configuration of wheels. An XYZ axes is used throughout the drawings to illustrate the axial (Y), forward (X), and vertical (Z) directions relative to axle 20.

When supporting aircraft 10 on runway 11, the weight of aircraft 10 may cause shock strut assemblies 30, 32, and/or 34 to compress. In various embodiments, landing gear 14, landing gear 16, and landing gear 18 may each employ a shock absorbing technique of forcing hydraulic fluid and entrapped gasses through an internal orifice within a compressible, telescopic strut of shock strut assemblies 30, 32, and 34. As aircraft 10 lands and the shock strut assemblies compress, a stroke length (as referred to as a "strut stroke") decreases and the internal volume within the strut is reduced. It may be desirable to know the stroke length of shock strut assemblies 30, 32, and 34, as it can be used to determine various aircraft conditions, for example, stroke length may be employed to determine a weight on wheels of aircraft 10. Stroke length may also be employed to calculate an internal volume within the strut. The internal volume calculation may be used to determine if the landing gear is working properly and/or if the fluid levels within the landing gear are sufficient. Proper internal volume and/or fluid levels and pressures help determine that during each aircraft landing event, the strut's gas and fluid levels are sufficient to absorb the energy of the airplane's transition from descending flight, through the landing impact, and to a smooth roll-out along runway 11.

Stroke length may be calculated by measuring an angle of a torque link of the strut. However, calculating the stroke length based on the angle of the torque link can lead to less accurate measurements, when the landing gear is in a compressed state, because the degree of angle, or rotational, change per unit of linear stroke change is decreased in the compressed state. For example, in an uncompressed state the degree of angle change per change in stroke length may be, for example, 1.0 degree of angle change per 2.0 inches (5.1 cm) of linear stroke change, and in a compressed state it may be, for example, 0.1 degree of angle change per 2.0 inches (5.1 cm) of linear stroke change. Accordingly, increasing an accuracy of the change in angle measurement, when the strut is in the compressed state may be desirable. In this regard, disclosed herein, in accordance with various embodiments, is a shock strut assembly having a rotational position sensor operably coupled to a torque link of the strut assembly and configured to display increased accuracy when the shock strut assembly is in a compressed state. In various embodiments, the rotational position sensor may be installed offset such that it is centered and near its null point when the landing gear is in a compressed state. Installing the rotational position sensor such that it is near its null point when the landing gear is compressed tends to increase the angle measurement accuracy which in turn increases the accuracy of the stroke length and internal volume measurements in the compressed state.

Figure 2A:
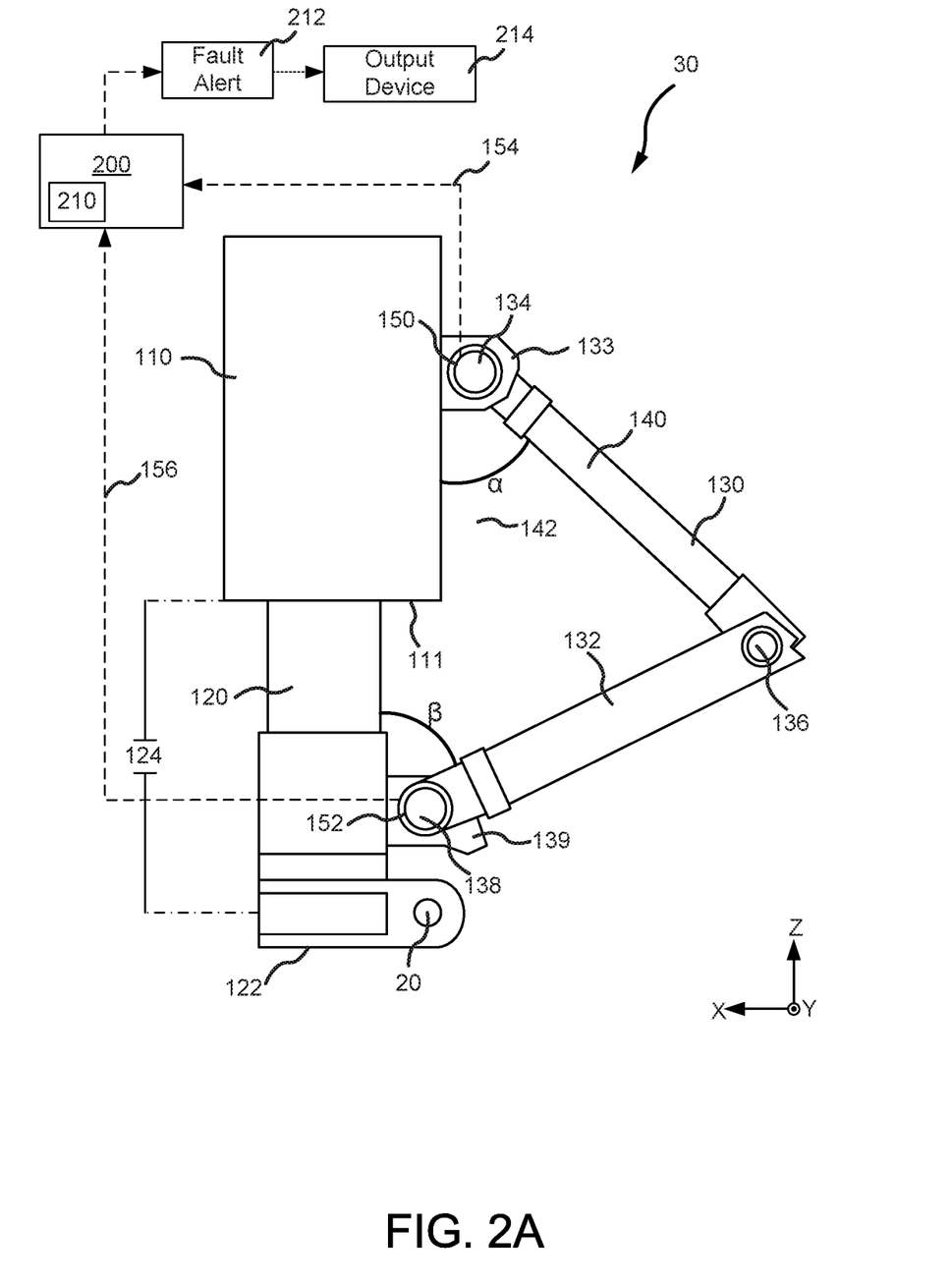
FIG. 2A illustrates a shock strut assembly with the strut piston at a first stroke length, in accordance with various embodiments.

With reference to FIG. 2A, shock strut assembly 30 is illustrated at a first stroke length 124, in accordance with various embodiments. Shock strut assembly 30 may comprise a strut cylinder 110 and a strut piston 120. In various embodiments, strut cylinder 110 may comprise a steering collar or other component that remains fixed with respect to aircraft 10 (with momentary reference to FIG. 1) during compression of shock strut assembly 30. Strut piston 120 may be operatively coupled to strut cylinder 110. Strut cylinder 110 may be configured to receive strut piston 120 in a manner that allows the two components to telescope with respect to one another. In this regard, strut piston 120 may translate into and out of strut cylinder 110 and absorb and damp forces transmitted thereto. Strut piston 120 may extend from strut cylinder 110 by a stroke length 124. In various embodiments, stroke length 124 may correspond to shock strut assembly 30 being in a fully compressed state. Axle 20 may be coupled proximate an end 122 of shock strut assembly 30 that is opposite strut cylinder 110. In various embodiments, a liquid, such as a hydraulic fluid and/or oil, and a gas, such as nitrogen, may be located within strut cylinder 110. The internal compressed volume may consist of a single cavity being compressed by translation of strut piston 120, or separate cavities containing different isolated fluids and gasses within the cavities. Strut piston 120 may compress into strut cylinder 110, in response to the cavity pressure being above a predetermined threshold.

Shock strut assembly 30 includes an upper torque link 130 and a lower torque link 132. Upper torque link 130 may be pivotally coupled to lower torque link 132 via a pivot joint 136. Pivot joint 136 may be configured to allow upper torque link 130 and lower torque link 132 to rotate relative to one another during translation of strut piston 120.

Upper torque link 130 may be pivotally coupled to strut cylinder 110 via a flange 133 and an upper torque link pin 134. As strut piston 120 translates (i.e., telescopes) relative to a base 111 of strut cylinder 110, upper torque link 130 and upper torque link pin 134 may rotate relative to flange 133 and strut cylinder 110. Lower torque link 132 may be pivotally coupled to strut piston 120 via a flange 139 and a lower torque link pin 138. As strut piston 120 translates relative to strut cylinder 110, lower torque link 132 and lower torque link pin 138 may rotate relative to flange 133 and strut piston 120.

In various embodiments, shock strut assembly 30 may include a rotational position sensor 150 operably coupled to upper torque link pin 134 and upper torque link 130. Rotational position sensor 150 may be configured to measure a rotation of upper torque link pin 134 about an axis that is parallel to axle 20. Stated differently, rotational position sensor 150 may be configured to output a signal 154 corresponding to an angle alpha (α) of upper torque link 130 relative to strut cylinder 110. Rotational position sensor 150 may comprise a rotary variable differential transformer (RVDT), a resolver, an encoder, or other sensor capable of measuring angle alpha.

In various embodiments, shock strut assembly 30 may include a rotational position sensor 152 operably coupled to lower torque link pin 138 and lower torque link 132. Rotational position sensor 152 may be configured to measure a rotation of lower torque link pin 138 about an axis that is parallel to axle 20. Stated differently, rotational position sensor 152 may be configured to output a signal 156 corresponding to an angle beta (β) of lower torque link 132 relative to strut piston 120. Rotational position sensor 152 may comprise a RVDT, a resolver, an encoder, or other sensor capable of measuring angle alpha.

In various embodiments, shock strut assembly 30 may be part of an articulated landing gear. In this regard, a rotational position sensor, similar to rotational position sensors 150 and 152, may be operably coupled to a torque link extending between shock strut assembly 30 (e.g., strut piston 120) and aircraft 10 (with momentary reference to FIG. 1). The rotational position sensor may be configured to output a signal corresponding to an angle of the torque link relative to the aircraft or to stationary elements of the landing gear.

Figure 2B:
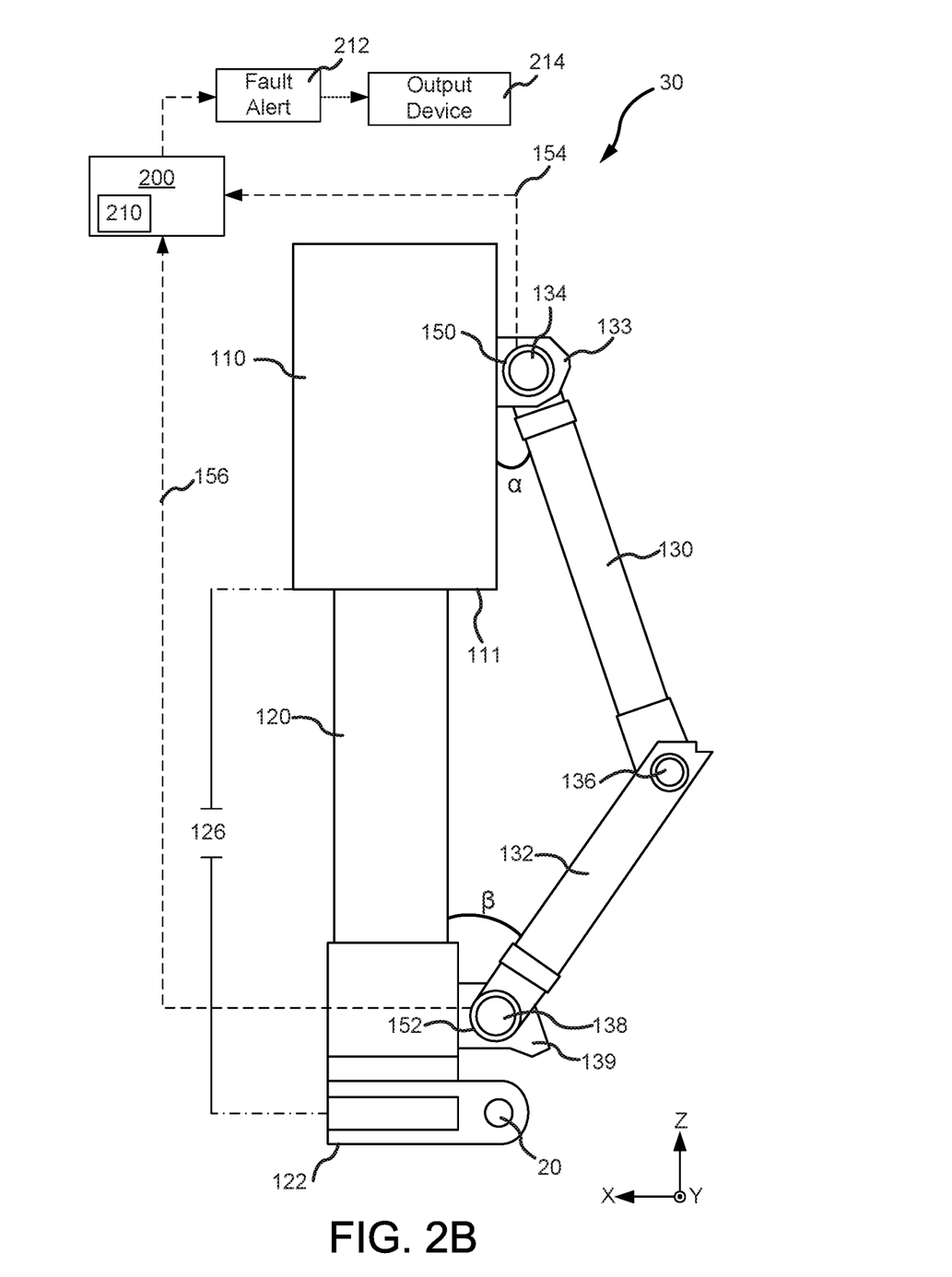
FIG. 2B illustrates a shock strut assembly with the strut piston at a second stroke length, in accordance with various embodiments.

With reference to FIG. 2B, shock strut assembly 30 is illustrated at a second stroke length 126, in accordance with various embodiments. While FIGS. 2A and 2B illustrate shock strut assembly 30, it should be understood that shock strut assemblies 32 and 34, with momentary reference to FIG. 1, may include the elements and functionalities as described herein with respect to shock strut assembly 30. As shock strut assembly 30 decompresses (i.e., as strut piston 120 translates out of strut cylinder 110), stroke length increases and angles alpha and beta decrease. In various embodiments, the change in angles alpha and beta per change in stroke length is decreased when shock strut assembly 30 is in a compressed state. For example, in the decompressed state of FIG. 2B (i.e., when strut piston 120 is at stroke length 126), an angle alpha and/or an angle beta change of 1.0 degree may represent a 2.0 inch (5.1 cm) change in stroke length 126, and in the compressed state of FIG. 2A (i.e., when strut piston 120 is at stroke length 124), a 0.1 degree change in angle alpha and/or in angle beta may represent a 2.0 inch (5.1 cm) change in stroke length 124.

In various embodiments, rotational position sensors 150 and 152 may be configured to exhibit increased accuracy, when shock strut assembly 30 is in a compressed state. For example, with reference to FIG. 3A, an exemplary graphical representation 250 of an accuracy of rotational position sensor 150 is illustrated, in accordance with various embodiments. While FIGS. 3A and 3B illustrate an accuracy and functionality of rotational position sensor 150, it should be understood that rotational position sensor 152, with momentary reference to FIG. 2A, may include the accuracy and functionalities as described herein with respect to rotational position sensor 150.

Figure 3A:
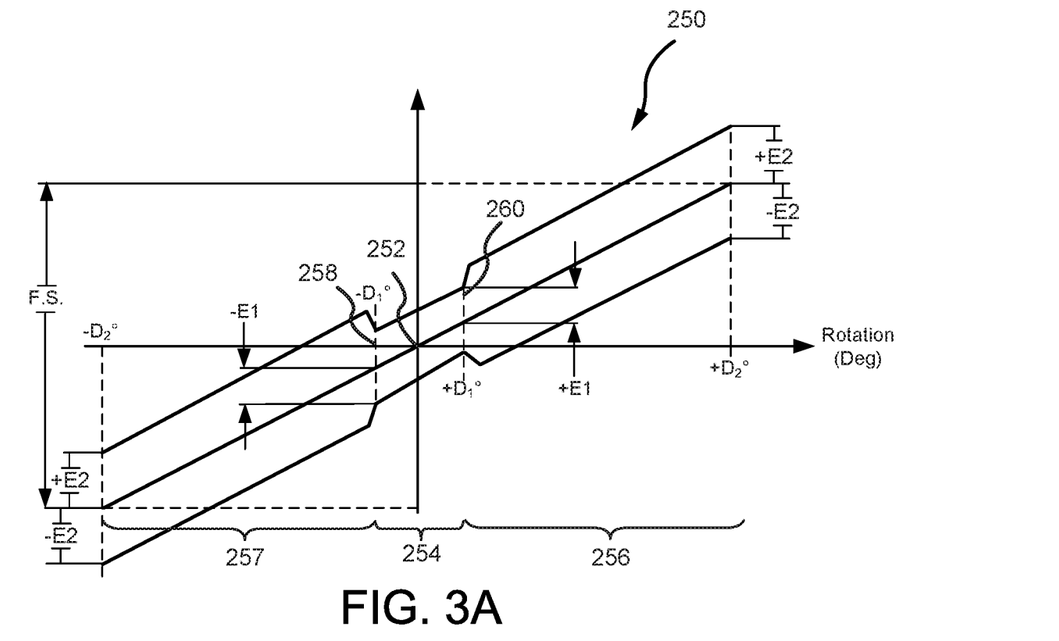
FIG. 3A illustrates a graphical representation of a rotational position sensor's accuracy relative to rotation from a null point of the rotational position sensor, in accordance with various embodiments.
Figure 3B:
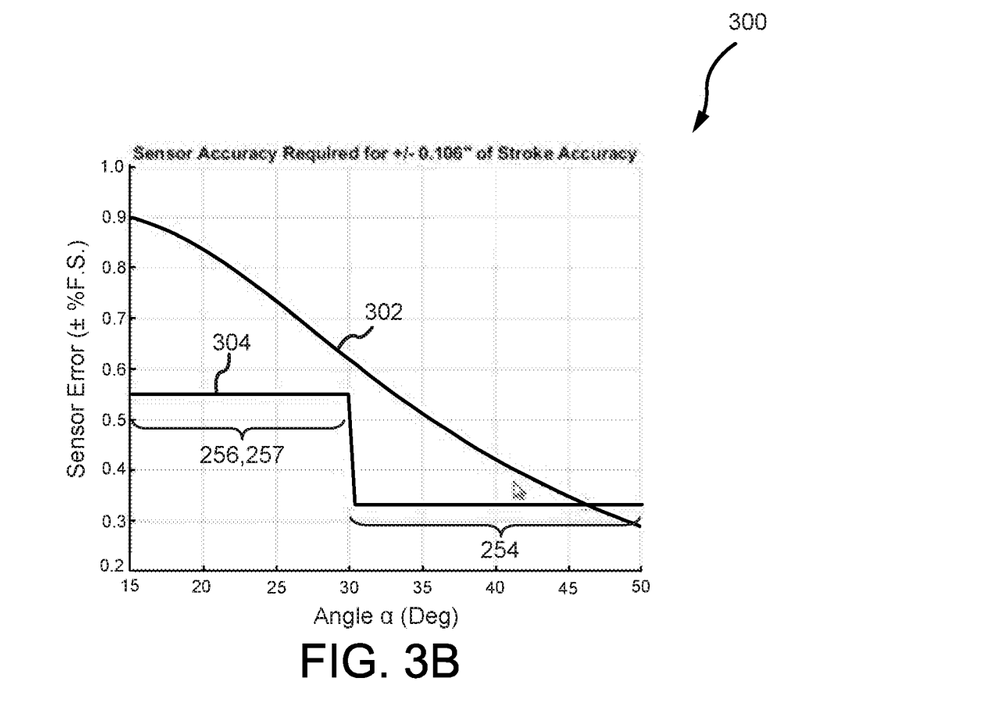
FIG. 3B illustrates a graphical representation comparing torque link angle to rotational position sensor error.

As shown in FIG. 3A, rotational position sensor 150 has a null accuracy band 254 extending from $-D_1°$ from a null point 252 of rotational position sensor 150 to $+D_1°$ from null point 252. Rotational position sensor 150 exhibits increased accuracy within null accuracy band 254. For example, rotational position sensor 150 has a maximum deviation, or error, of $±E1$ within null accuracy band 254. In other words, a counter clockwise rotation of up to $D_1°$ from null point 252 of rotational position sensor 150 may produce a maximum deviation, or error, of $±E1$, and a clockwise rotation of up to $D_1°$ from null point 252 may produce a maximum deviation, or error, of $±E1$. In various embodiments, error E1 may be measured as a percentage of the full scale span (% F.S.) of rotational position sensor 150.

As used herein, "null accuracy band" refers to the area generally proximate the null point of the rotational position sensor (e.g., within a predetermined number of degrees, for example, ±10°, from the null point) and wherein the rotational position sensor exhibits the greatest accuracy (i.e., exhibits the smallest maximum deviation or smallest error). In various embodiments, the error E1 within null accuracy band 254 may be between ±0.20% and ±0.50% of the rotational position sensor's full scale span. In various embodiments, the error E1 within null accuracy band 254 may be between ±0.25% and ±0.40% of the rotational position sensor's full scale span. In various embodiments, the error E1 within null accuracy band 254 may be ±0.333% of the rotational position sensor's full scale span. In various embodiments, $D_1°$ may be 10° such that null accuracy band 254 extends ±10° from null point 252. In other words, rotational position sensor 150 may exhibit its greatest accuracy from −10° from null point 252 to +10° from null point 252. It should be understood that the span of null accuracy band 254 (i.e., the number of degrees between $-D_1°$ and $+D_1°$ may be dependent on the type of rotational position sensor employed and/or the accuracy needed for a particular shock strut assembly. For example, in various embodiments, rotational position sensor 150 may comprise a null accuracy band 254 of ±5° from null point 252. In various embodiments, rotational position sensor 150 may comprise a null accuracy band 254 of ±15° from null point 252.

Rotational position sensor 150 may exhibit a greater deviation, or error, outside of null accuracy band 254. Stated differently, once rotational position sensor 150 rotates beyond $±D_1°$ from null point 252, the accuracy of rotational position sensor 150 may decrease. In various embodiments, rotational position sensor 150 exhibits an error $±E2$, which is greater than error $±E1$, in an area 256 and in an area 257, which are each outside of null accuracy band 254. For example, rotational position sensor 150 may exhibit error $±E2$ from $+D_1°$ to $+D_2°$ and from $-D_1°$ to $-D_2°$. In this regard, a clockwise rotation of greater than $D_1°$ and less than or equal to $D_2°$ from null point 252 may produce a maximum error of $±E2$, and a counter clockwise rotation of greater than $D_1°$ and less than or equal to $D_2°$ from null point 252 may produce a maximum error of $±E2$.

Error E2 is greater than error E1. In various embodiments, error E2 may be greater than ±0.50% of the rotational position sensor's full scale span. In various embodiments, error E2 may be between ±0.50% and ±1.0% of the rotational position sensor's full scale span. In various embodiments, error E1 may be ±0.333% of the rotational position sensor's full scale span and error E2 may be ±0.555% of the rotational position sensor's full scale span. Accordingly, angle alpha signals generated when rotational position sensor 150 is within null accuracy band 254 tend to be more accurate (i.e., have a decreased error), as compared to angle alpha signals generated outside of null accuracy band 254. In various embodiments, $D_1°$ may be 10° and $D_2°$ may be 30°. In this regard, a counter clockwise rotation of greater than 10° and less than or equal to 30° from null point 252 exhibits a maximum error of $±E2$, and a clockwise rotation of greater than 10° and less than or equal to 30° from null point 252 exhibits a maximum error of $±E2$. With combined reference to FIGS. 3A and 2B, in various embodiments, rotational position sensor 150 may be configured such that, after strut piston 120 translates out of strut cylinder 110 a predetermined stroke length, rotational position sensor 150 will move away from null accuracy band 254, i.e., will be in area 256.

While FIG. 3A illustrates rotational position sensor 150 as having two accuracy ranges (i.e., null accuracy band 254 having error E1 and area 256 having error E2), it should be understood that rotational position sensor 150 may include any number of accuracy ranges. For example, in various embodiments, rotational position sensor 150 may comprise a null accuracy band extending from −±10° to +10° and which may produce a first maximum error, a transition range extending from −10° to −15° and +10° to +15° and which may produce a second maximum error which is greater than the maximum error in the null accuracy band, and a wide range outside of ±15° and which may produce a third maximum error which is greater than the maximum errors in the null accuracy band and transition range.

FIG. 3B illustrates a graphical representation 300 showing the sensor accuracy needed to have a stroke accuracy of ±0.106 inches (±0.269 cm) at various angle alphas. Line 302 shows the needed sensor accuracy to maintain a constant actual accuracy on the landing gear, when accounting for mechanical resolution. As line 302 illustrates, as angle alpha increases (i.e., as the shock strut assembly compresses and stroke length decreases), the rotational position sensor error (±% F.S.) needed to keep the stroke accuracy at ±0.106 inches (±0.269 cm) decreases. For example, at an angle alpha of 30°, a rotational position sensor error of approximately ±0.62% of the rotational position sensor's full scale span is needed for a stroke accuracy of ±0.106 inches (±0.269 cm), and at an angle alpha of 45°, a rotational position sensor error of approximately ±0.35% of the rotational position sensor's full scale span is needed for a stroke accuracy of ±0.106 inches (±0.269 cm). Line 304 illustrates that configuring rotational position sensor 150 such that it is within its null accuracy band 254 when shock strut assembly 30 is compressed (e.g., when angle alpha is between 30° and 47°) and outside its null accuracy band 254 when shock strut assembly 30 is extended (i.e., when angle alpha less than 30°) allows for the sensor error to be at or below the sensor error needed to produce a stroke accuracy of ±0.106 inches (±0.269 cm).

With combined reference to FIGS. 3A and 3B and FIG. 2A, in various embodiments, rotational position sensor 150 is installed such that it will be at or near an edge 258 of its null accuracy band 254 (i.e., at $-D_1°$), when shock strut assembly 30 is fully compressed. In other words, the angle alpha corresponding to a maximum compression of shock strut assembly 30 will correspond to rotational position sensor 150 being at or near edge 258 of null accuracy band 254. Stated yet another way, rotational position sensor 150 is installed such that it will be at or near edge 258 of null accuracy band 254, when strut piston is at stroke length 124. As used in the previous context only, "near" means ±0.5°. In various embodiments, angles alpha and beta may be between 40° and 70°, when shock strut assembly 30 is in the fully compressed state (i.e., when strut piston is at stroke length 124). In various embodiments, angle alpha and beta may be between 45° and 60, when shock strut assembly 30 is in the fully compressed state. In various embodiments, angles alpha and beta may be approximately 50°, when shock strut assembly 30 is in the fully compressed state. As used in the previous context only, "approximately" means ±2°.

Configuring edge 258 of null accuracy band 254 to coincide with the fully compressed state of shock strut assembly 30 allows for an increased or maximum utilization of null accuracy band 254 in the compressed states. For example, in various embodiments, configuring edge 258 of null accuracy band 254 to coincide with the fully compressed state may allow for an angle alpha range of 20° (e.g., −10° to +10°) to be within the null accuracy band 254. Once rotational position sensor 150 has rotated beyond the null accuracy band 254, shock strut assembly 30 is in a less compressed state such that the increased potential error ±E2 of area 256 is acceptable due to the increased angle alpha change per stroke change.

In various embodiments, rotational position sensor 150 may be installed such that it will be within null accuracy band 254 for a predetermined range of torque link angles. In this regard, edge 258 may correspond with a first predetermined stroke length and null point 252 may correspond with a second predetermined stroke length. For example, with combined reference to FIG. 3A and FIGS. 2A and 2B, rotational position sensor 150 may be configured such that as strut piston 120 translates from stroke length 124 to stroke length 126, rotational position sensor 150 rotates from edge 258 of null accuracy band 254 to null point 252, and as strut piston 120 translates beyond stroke length 126, rotational position sensor 150 rotates away from null point 252 and toward edge 260 of null accuracy band 254. In various embodiments, edge 260 of null accuracy band 254 may correspond to a third predetermined stroke length, such that as strut piston 120 translates beyond third predetermined stroke length, rotational position sensor 150 rotates past $+D_1°$ (i.e., out of null accuracy band 254 and into area 256). It should be understood that the sensor error (% F.S.) of the null accuracy band 254 and of the areas 256, 257 outside the null accuracy band 254 may be selected depending on the stroke length accuracy needed for a particular shock strut assembly. For example, a greater maximum error ±E1 may be used if a stroke length accuracy of 0.3 inches (0.76 cm) is acceptable.

Returning to FIGS. 2A and 2B, in various embodiments, rotational position sensor 150 may output a rotational data signal 154 corresponding to angle alpha to a controller 200. Rotational position sensor 152 may output a rotational data signal 156 corresponding to angle beta to controller 200. Controller 200 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 200 may receive rotational data signals 154 and 156 from rotational position sensors 150 and 152, respectively. Rotational position sensors 150 and 152 may output data to controller 200 as a voltage signal, a current signal, a digital signal, or any other suitable signal, whether filtered, conditioned, or otherwise preprocessed. Controller 200 may include a memory 210. Memory 210 may store executable instructions and data to implement control logic of controller 200. Memory 210 may comprise a tangible, non-transitory storage medium and may store data used, for example, for trending and prognosis purposes.

Controller 200 may interpret data received from rotational position sensors 150 and 152 to determine a stroke length of strut piston 120 and an internal volume and/or fluid level within strut cylinder 110. Controller 200 may interpret data received from rotational position sensors 150 and 152 for landing gear maintenance or other aircraft operations. For example, data received from rotational position sensors 150 and 152 may be used to determine a weight on wheel. In various embodiments, controller 200 may receive and may use multiple data outputs from one or more other aircraft sensors (e.g., landing gear temperature sensors, landing gear pressure sensors, etc.) and/or avionics units, in addition to the data received from rotational position sensors 150 and 152. Data received from rotational position sensor 150 may allow controller 200 to detect the presence of a landing gear fault condition or other operating anomaly with increased accuracy.

In various embodiments, upon recognition of a landing gear fault condition, controller 200 will order a fault alert 212 to be output by an output device 214. Output device 214 may be configured to communicate information to the pilot, co-pilot, and/or maintenance crew relating to shock strut assembly 30 and/or landing gear 14, with momentary reference to FIG. 1. For example, in various embodiments, output device 214 includes a display, a speaker, a network access device, and/or the like that sends a message to a remote terminal, or the like. Controller 200 may control output device 214 to output the health status of shock strut assembly 30 to the cockpit of the aircraft or in the form of an alert to mechanics servicing the aircraft from a centralized system. Fault alert 212 may be displayed as a symptom code included in an aircraft health report, which may be reviewed during a post flight check and/or during a routine maintenance inspection. In various embodiments, fault alert 212 may be displayed on output device 214 to indicate immediate maintenance is needed.

Figure 4A:
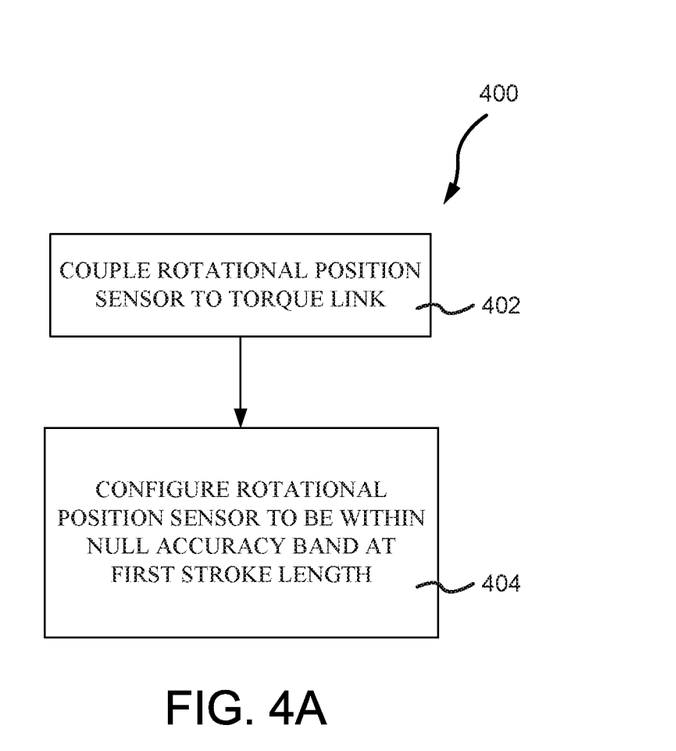
FIGS. 4A and 4B illustrate a method of installing a rotational position sensor in a shock strut assembly, in accordance with various embodiments.
Figure 4B:
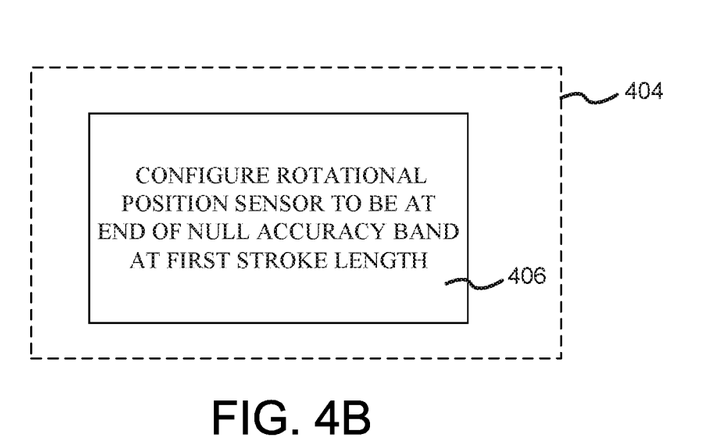

With reference to FIGS. 4A and 4B, a method 400 of installing a rotational position sensor in a shock strut assembly is illustrated, according to various embodiments. In various embodiments, method 400 may comprise operably coupling a rotational position sensor to a torque link of a shock strut assembly (step 402), and configuring the rotational position sensor to be within a null accuracy band of the rotational position sensor when the shock strut assembly is at a first stoke length (step 404). In various embodiments, step 404 may comprise configuring the rotational position sensor to be at or near an edge of the null accuracy band when the shock strut assembly is at the first stroke length (step 406).

With combined reference to FIGS. 2A, 3A, 4A, and 4B, in various embodiments, step 402 may include operably coupling rotational position sensor 150 to upper torque link 130 of shock strut assembly 30. Step 404 may include configuring rotational position sensor 150 to be within null accuracy band 254 when shock strut assembly 30 is at stroke length 124. Step 406 may include configuring rotational position sensor 150 to be at or near edge 258 of null accuracy band 254 when shock strut assembly 30 is at stroke length 124. In various embodiments, rotational position sensor 150 comprises first error range ±E1 within null accuracy band 254 and second error range ±E2 outside null accuracy band 254. In various embodiments, stroke length 124 may correspond to shock strut assembly 30 being in a fully compressed state.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut assembly, comprising:
   a strut cylinder;
   a strut piston configured to telescope relative to the strut cylinder;
   a first torque link pivotally coupled to the strut cylinder;
   a second torque link pivotally coupled to the strut piston; and
   a rotational position sensor configured to output a signal corresponding to an angle of at least one of the first torque link relative to the strut cylinder or the second torque link relative to the strut piston, wherein the rotational position sensor is oriented such that the rotational position sensor is within a null accuracy band of the rotational position sensor in response to the strut piston being at a first stroke length, and wherein the rotational position sensor comprises a first error range within the null accuracy band and a second error range outside the null accuracy band, the second error range being greater than the first error range.

2. The shock strut assembly of claim 1, wherein the rotational position sensor is oriented such that the rotational position sensor is at or near an edge of the null accuracy band in response to the strut piston being at the first stroke length.

3. The shock strut assembly of claim 2, wherein the first stroke length corresponds to the shock strut assembly being in a fully compressed state.

4. The shock strut assembly of claim 2, wherein the rotational position sensor is oriented such that as the strut piston translates between the first stroke length and a second stroke length the rotational position sensor rotates toward a null point of the rotational position sensor, wherein the second stroke length is greater than the first stroke length.

5. The shock strut assembly of claim 4, wherein the rotational position sensor is oriented such that as the strut piston translates beyond the second stroke length the rotational position sensor rotates away from the null point of the rotational position sensor.

6. The shock strut assembly of claim 1, wherein the rotational position sensor is oriented such that the rotational position sensor will be within the null accuracy band for a predetermined range of torque link angles.

7. The shock strut assembly of claim 1, wherein the rotational position sensor comprises at least one of a rotary variable differential transformer, a resolver, or an encoder.

8. A landing gear assembly, comprising:
   an axle configured to support a wheel; and
   a shock strut assembly coupled to the axle, the shock strut assembly comprising:
      a strut cylinder;
      a strut piston configured to telescope relative to the strut cylinder;
      a first torque link pivotally coupled to the strut cylinder;
      a second torque link pivotally coupled to the strut piston; and
      a rotational position sensor configured to output a signal corresponding to an angle of at least one of the first torque link relative to the the strut cylinder or the second torque link relative to the strut piston, wherein the rotational position sensor is oriented such that the rotational position sensor is within a null accuracy band of the rotational position sensor in response to the strut piston being at a first stroke length, and wherein the rotational position sensor comprises a first error range within the null accuracy band and a second error range outside the null accuracy band, the second error range being greater than the first error range.

9. The landing gear assembly of claim 8, wherein the rotational position sensor is oriented such that the rotational position sensor is at or near an edge of the null accuracy band in response to the strut piston being at the first stroke length.

10. The landing gear assembly of claim 9, wherein the first stroke length corresponds to the shock strut assembly being in a fully compressed state.

11. The landing gear assembly of claim 8, wherein the rotational position sensor is oriented such that the null accuracy band extends from a torque link angle of 30° to a torque link angle of 50°.

12. The landing gear assembly of claim 8, further comprising a controller configured to receive a rotational data signal from the rotational position sensor and determine a stroke length based on the rotational data signal.

13. The landing gear assembly of claim 8, wherein the rotational position sensor is oriented such that as the strut piston translates between the first stroke length and a second stroke length the rotational position sensor rotates toward a null point of the rotational position sensor, and wherein the rotational position sensor is oriented such that as the strut piston translates between the second stroke length and a third stroke length the rotational position sensor rotates away from the null point of the rotational position sensor.

14. The landing gear assembly of claim 13, wherein the second stroke length is greater than the first stroke length, and wherein the third stroke length is greater than the second stroke length.

15. A method of installing a rotational position sensor in a shock strut assembly, comprising:
  operably coupling the rotational position sensor to a torque link of the shock strut assembly; and
  configuring the rotational position sensor to be within a null accuracy band of the rotational position sensor in response to the shock strut assembly being at a first stroke length, wherein the rotational position sensor comprises a first error range within the null accuracy band and a second error range outside the null accuracy band, the second error range being greater than the first error range.

16. The method of claim 15, wherein the configuring the rotational position sensor to be within the null accuracy band of the rotational position sensor in response to the shock strut assembly being at the first stroke length comprises configuring the rotational position sensor to be at or near an edge of the null accuracy band in response to the shock strut assembly being at the first stroke length.

17. The method of claim 16, wherein the first stroke length corresponds to the shock strut assembly being in a fully compressed state.

* * * * *